Patented Oct. 26, 1926.

1,604,577

UNITED STATES PATENT OFFICE.

JOHN W. STOCKETT, JR., OF WASHINGTON, DISTRICT OF COLUMBIA, ASSIGNOR TO NATIONAL LIME ASSOCIATION, OF WASHINGTON, DISTRICT OF COLUMBIA, A CORPORATION OF THE DISTRICT OF COLUMBIA.

QUICK-SETTING LIME AND PROCESS OF MAKING SAME.

No Drawing. Application filed August 17, 1925. Serial No. 50,795.

My invention relates to lime products and the process of making the same. More specifically, my invention relates to the production of quick setting and quick hardening cementitious lime products of adequate strength and composed entirely of lime ingredients and the process of preparing the same.

In several industries, for example, in the production of plasters and molded products, such as wall-blocks, partition blocks and tiles, it is quite desirable to use a lime product which will set and harden quickly and at the same time develop an adequate tensile strength. In the plastering industry it is customary to apply three coats namely, the scratch, the brown and the finish coats. These coats are applied in the order named and in each case two or three days must be allowed for the first coat to set before the second coat can be applied. The mechanism of the reaction involved is usually explained as follows:

A lime putty or mortar sets due to its property of chemically combining with the carbon dioxide of the atmosphere and thereby reverting to calcium carbonate.

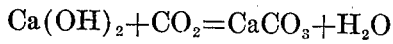

It is generally believed that the carbonation does not cause hardening until the moisture content of the putty or mortar has been reduced, by drying, to about seven per cent. The time of set is then an additive function of the time for the material to dry plus the time of carbonation.

Obviously, the use of a lime putty or hydrated lime as a plastic necessitates the allowance of a considerable time period in order for the plastic to set and harden. Further, the setting of the lime putty is accompanied by a shrinkage.

Various products and processes have been utilized to overcome these deficiencies. It has been proposed to subject the plastic to a drying action, to add a substance which itself has quick setting properties or which reacts with the lime forming a new entity which has quick setting and hardening properties. None of these, as far as I am aware, are entirely satisfactory. Some tend to reduce the plasticity and working qualities of the lime; others discolor the same and still others reduce the carrying capacity of the lime.

It is the main object of my invention to provide a set and hardened composition prepared from substantially completely hydrated lime or a putty which is the hydrated lime mixed with water, and quicklime, which attains its set, and hardness, and strength quickly on transition from the plastic state without the use of any accelerating agent other than that present in the hydrated lime and quicklime mixture. Auxiliary to the main object, is the provision of a process of preparing the set and hardened composition.

It is also desired to take advantage of the discovery that my quick setting and hardening lime, in contra distinction to ordinary commercial lime (lime hydrate or putty) expands slightly on setting thereby developing a hard dense mass. The setting of a putty prepared from commercial lime is accompanied by shrinkage. The property of my quick setting and hardening lime, whereby it expands on setting permits the molding of the material into blocks, tiles and the like which will develop a proper tensile strength. Accordingly, it is an object of my invention to prepare from my quick setting and hardening plastic composition, as articles of manufacture, molded products.

In order to prepare my quick setting product quicklime is ground to a fine powder, preferably of such a fineness that all the particles will pass through a standard 50-mesh sieve and mixed with commercial hydrated lime in such proportions as to form when mixed with water a quick setting mixture, capable of expanding when it sets and hardens.

Examples of suitable plastering mixes are as follows:

Scratch coat.

35 parts of finely powdered quicklime intimately mixed with 65 parts of hydrated lime, plus the desired amount of sand, filler such as hair and water.

Brown coat.

30 parts of finely powdered quicklime intimately mixed with 70 parts of hydrated lime plus the desired amount of sand and water.

Finish coat.

20 parts of finely powdered quicklime intimately mixed with 80 parts of hydrated lime, plus the desired amount of water.

Using my quick setting lime the scratch and brown coat may be applied during the same day and the finish coat the next day. In some instances the three coats may be applied the same day. It is of course understood that these properties are merely indicative of preferred mixes and may be varied as the occasion demands, as long as the resulting products quickly attain the property of setting and hardening on transition from the plastic state and, in addition, develop a proper tensile strength.

A quick setting mixture suitable for building blocks, tiles and the like is as follows:

40 parts of finely powdered quicklime intimately mixed with 60 parts of hydrated lime plus the desired amount of water and such inert ingredients as wood fibre, sawdust, talc, limestone, asbestos and silica.

The above represent the preferred proportions which may be changed as the circumstances demand. The molded blocks form admirable wall blocks. They may be prepared at the factory or the component ingredients may be shipped in bulk, either separately or mixed in suitable proportions and the blocks formed at the place of use. In either case, the quick setting property of the mixture adapts the same to commercial use enabling production in quantity at the factory or if mixed at the place of use, avoids delay.

Another suitable mixture is as follows: 7½ pounds of 50-mesh quicklime, 10 pounds of hydrated lime, 2 pounds of sawdust carrying a small amount of plastering hair and 17 pounds of warm water.

The solids may be first mixed dry and the water added to the mixture or the dry mixture added to the water. The most satisfactory results are obtained by first mixing the hydrate and sawdust with all the water required for the batch and then permitting the mixture to age until ready for casting into blocks, whereupon the quicklime is added. Cold water may be used but the most satisfactory results are obtained with the mixing water at a temperature of about 100° F. The warm water is a good accelerator for the mixture. When using putty, the excess water should be just sufficient to be taken up by the quicklime which is added. This method of mixing permits the use of putty prepared from quicklime in lieu of that prepared from lime hydrate. The mode of procedure, therefore, in its preferred form, consists of preparing a putty from lump lime, mixing in the desired quantity of sawdust or wood fibre and then gauging the mixture with a predetermined amount of finely divided quicklime for example, of about 50-mesh, just before pouring into the molds.

Blocks prepared from the above mixture may be made by any suitable block casting machine. In actual practice very satisfactory results have been obtained by the use of the Her-Born machine as used at the Sandusky, Ohio, plant of the Her-Born Engineering and Manufacturing Company. The Her-Born machine operates as follows:

The mix is automatically delivered from a mixer to a battery of thirty-six molds mounted on edge on a revolving table. An automatic measuring device delivers the desired proportions of mix and water to the mixer. The mixer carries sufficient material to fill three molds; as one batch is poured the ingredients for another batch are fed to the mixer so that there are always three batches in the mixer. As the table revolves the sides of the molds automatically open and a plunger operates to eject the blocks from the cores. The speed of the table is variable from one revolution in five minutes to one revolution in fifteen minutes. The measuring device and mixer are geared in synchronism with the table. A five horse power induction motor serves to operate the entire unit.

In making large blocks 3"x12"x30", it was noted that the mix had a tendency to "bake" to the surface of the mold which was lined with aluminum. In an effort to reduce the surface friction between the mix and the mold several types of lubricants were tried, such as transmission oil, lard oil, light machine oil, stearic acid, beeswax and brown soap, but none of these were quite satisfactory. Excellent results were finally obtained by copper plating the aluminum cores and relining the molds with brass. In one run, blocks made of my mixture and cast in the Her-Born machine were ready to be ejected in the form of blocks in eight minutes. In another run, the mix was ready to be ejected in the form of blocks in twelve minutes.

Blocks cast with rectangular core spaces in a Her-Born machine and aged for a period of one month upon test gave the following results:

| No. | Weight (lbs.). | Per cent absorption (24 hrs. soaking). | Compressive strength (lbs./sq. in.). |
|---|---|---|---|
| 9 | 22 | 50 | 87 |
| 11 | 21¾ | 60 | 70 |
| 15 | 21½ | 70 | 54 |

Blocks made with elliptical core spaces give the following results:

| No. | Weight (lbs.). | Per cent absorption (24 hrs. soaking). | Compressive strength (lbs./sq. in.). |
|---|---|---|---|
| 1 | 23¼ | 52 | |
| 2 | 23½ | | 118 |
| 3 | 23¾ | | 105 |
| 4 | 24½ | | 103 |
| 5 | 23 | 54 | |
| 6 | 24½ | | 117 |
| 7 | 24½ | | 91 |
| 8 | 25 | | 110 |

Blocks Nos. 7 and 8 had an addition of 5% alum by weight of the lime. It has been attempted to produce molded blocks of ordinary commercial lime but the efforts in this direction have not been very successful since the blocks do not possess any quick setting property and shrink on standing failing to attain a reasonable tensile strength. Test specimens prepared from commercial lime and my quick setting lime and tested under the same conditions gave the following results:

| Material. | Tensile strength (lbs. per sq. in.). | | |
|---|---|---|---|
| | 3 hrs. | 14 days | 28 days. |
| Commercial lime | ¹0 | 7 | 21 |
| Quick setting lime | 7 | 43 | 46 |

¹ Specimen not set in 3 hrs.

In three hours, the commercial lime had not set. My quick setting lime set, hardened and developed a material tensile strength in the same time-period. As far as I am aware, I am the first to prepare a quick setting lime product composed entirely of lime ingredients, quicklime and lime hydrate and in addition, possessing the property of expanding on quickly setting to develop a reasonable tensile strength.

When it is desired to retard the setting of the lime, retarders, such as glue, gum arabic, casein and sugar may be added.

It is quite obvious that in special cases small amounts of Portland cement or gypsum may be added.

The terms "quick setting" and "set quickly" are used in the specification and claims to distinguish between slow setting hydrated lime which requires about twenty hours to acquire its initial set and my material which may set in less than half of this time. I do not desire to set any definite limit as to the time it takes my material to acquire its initial set as this will depend in some measure, on the character of the quick lime and the lime hydrate used and upon various other factors including the percentage of these constituents present in the mixture.

The terms "quick hardening" and "harden quickly" in the specification and claims are used to distinguish between lime hydrate which requires many days to harden and my product which hardens very materially in a few hours as indicated by the tensile strengths.

The term "hydrated lime" as used in the specification and claims includes the various kinds of commercial hydrated lime which may vary considerably in its composition. It is intended to include thereunder both calcium and dolomitic hydrated lime. This term is also intended to cover that form of hydrated lime which is known as "putty".

The present application is a continuation in part of my prior application Serial No. 605,510, filed December 7, 1922.

I claim:—

1. A moldable composition comprising a mixture of substantially completely hydrated lime, water, and finely ground quicklime in such proportions as to induce the mixture to set and harden quickly on transition from the plastic state without the use of any accelerating agent other than that present in the mixture, said mixture being characterized by the properties of expanding on setting, failure to disintegrate on standing and the rapid development of a substantial tensile strength.

2. A moldable composition comprising a mixture of substantially completely hydrated lime, water, and quicklime ground to about 50 mesh in such proportions as to induce the mixture to set and harden quickly on transition from the plastic state without the use of any accelerating agent other than that present in the mixture, said mixture being characterized by the properties of expanding on setting, failure to disintegrate on standing and the rapid development of a substantial tensile strength.

3. A moldable composition comprising a mixture of substantially completely hydrated lime in the form of a putty, water and finely ground quicklime in such proportions as to induce the mixture to set and harden quickly on transition from the plastic state without the use of any accelerating agent other than that present in the mixture, said mixture being characterized by the properties of expanding on setting, failure to disintegrate on standing and the rapid development of a substantial tensile strength.

4. A moldable composition comprising a mixture of a predetermined quantity of finely ground quicklime, and substantially completely hydrated lime in the form of a putty carrying excess water in an amount just about sufficient to be taken up by the quicklime, these ingredients being present in such proportions as to induce the mixture to set and harden quickly on transition from the plastic state without the use of any accelerating agent other than that present in the mixture, said mixture being characterized by the properties of expanding on setting, failure to disintegrate on standing and the rapid development of a substantial tensile strength.

5. The process of making a quick setting and quick hardening cementitious lime product comprising mixing substantially completely hydrated lime with a predetermined quantity of water sufficient for the entire batch, permitting the mixture to age, then adding finely ground quicklime just before the mixture is ready to be poured into a mold, pouring said mixture into a mold, and molding without agitation, the proportion of hydrated lime and quick lime present being such as to induce the resulting mixture to set and harden quickly on transition from the plastic state without the use of any accelerating agent other than that present in the mixture, said mixture being characterized by the properties of expanding on setting, failure to disintegrate on standing and the rapid development of a substantial tensile strength.

6. The process of making a quick setting and quick hardening cementitious lime product comprising mixing substantially completely hydrated lime with a predetermined quantity of warm water sufficient for the entire batch, permitting the mixture to age, then adding finely ground quicklime just before the mixture is ready to be poured into a mold, pouring said mixture into a mold and molding without agitation, the proportion of hydrated lime and quicklime present being such as to induce the resulting mixture to set and harden quickly on transition from the plastic state without the use of any accelerating agent other than that present in the mixture, said mixture being characterized by the properties of expanding on setting, failure to disintegrate on standing and the rapid development of a substantial tensile strength.

7. As an article of manufacture, a building block prepared from a mixture of substantially completely hydrated lime and finely ground quicklime which attains its set and hardens quickly on transition from the plastic state without the use of any accelerating agent other than that present in the hydrated lime-quicklime mixture, and simultaneously expands, said block being characterized by the properties of quickly attaining an adequate tensile strength and failure to disintegrate on standing.

8. As an article of manufacture, a cast building block prepared from a mixture of substantially completely hydrated lime and finely ground quicklime which attains its set and hardens quickly on transition from the plastic state without the use of any accelerating agent other than that present in the hydrated lime-quicklime mixture, and simultaneously expands, said block being characterized by being capable of being ejected in block form in from eight to twelve minutes when cast in a machine of the Her-Born type, quickly attaining an adequate tensile strength and failure to disintegrate on standing.

9. As an article of manufacture, a building block prepared from a mixture of substantially completely hydrated lime and finely ground quicklime which attains its set and hardens quickly on transition from the plastic state without the use of any accelerating agent other than that present in the hydrated lime-quicklime mixture, and simultaneously expands, said block being characterized by a compressive strength greater than 50 pounds per square inch after aging one month and failure to disintegrate on standing.

10. The process of making a lime product which consists in mixing quicklime with substantially completely hydrated lime in the presence of water, pouring said mixture into a mold substantially immediately after mixing, and molding without agitation whereby the reaction between the mix-constituents occurs.

In testimony whereof he hereunto affixes his signature.

JOHN W. STOCKETT, Jr.